(12) United States Patent
Williams et al.

(10) Patent No.: US 6,513,050 B1
(45) Date of Patent: Jan. 28, 2003

(54) METHOD OF PRODUCING A CHECKPOINT WHICH DESCRIBES A BOX FILE AND A METHOD OF GENERATING A DIFFERENCE FILE DEFINING DIFFERENCES BETWEEN AN UPDATED FILE AND A BASE FILE

(75) Inventors: Dominic C. C. Williams, London (GB); Christian M. Korn, London (GB)

(73) Assignee: Connected Place Limited, London (GB)

( * ) Notice: Subject to any disclaimer, the term of this patent is extended or adjusted under 35 U.S.C. 154(b) by 0 days.

(21) Appl. No.: 09/247,511

(22) Filed: Feb. 10, 1999

(30) Foreign Application Priority Data

Aug. 17, 1998 (GB) .............................. 9817922

(51) Int. Cl.$^7$ .............................. G06F 17/30
(52) U.S. Cl. ...................... 707/202; 707/204; 707/101; 709/248; 714/12
(58) Field of Search ................ 707/530, 511, 707/101, 201, 100, 202–204; 714/12; 709/248

(56) References Cited

U.S. PATENT DOCUMENTS

| | | | | | |
|---|---|---|---|---|---|
| 480,182 | A | * | 8/1892 | Dial | 112/228 |
| 4,641,274 | A | * | 2/1987 | Swank | 707/531 |
| 4,807,182 | A | | 2/1989 | Queen | 707/511 |
| 5,479,654 | A | * | 12/1995 | Squibb | 707/201 |
| 5,615,287 | A | * | 3/1997 | Fu et al. | 382/199 |
| 5,634,052 | A | * | 5/1997 | Morris | 707/1 |
| 5,684,991 | A | * | 11/1997 | Malcolm | 707/204 |
| 5,758,358 | A | * | 5/1998 | Ebbo | 707/203 |
| 5,806,078 | A | * | 9/1998 | Hug et al. | 707/203 |
| 5,909,677 | A | * | 6/1999 | Broder et al. | 707/1 |
| 5,990,810 | A | * | 11/1999 | Williams | 341/51 |
| 6,198,850 | B1 | * | 3/2001 | Banton | 358/430 |
| 6,216,140 | B1 | * | 4/2001 | Kramer | 707/10 |
| 6,266,683 | B1 | * | 7/2001 | Yehuda et al. | 707/512 |
| 6,314,434 | B1 | * | 11/2001 | Shigemi et al. | 707/203 |

FOREIGN PATENT DOCUMENTS

| | | | |
|---|---|---|---|
| EP | 0 541 281 A2 | 5/1993 | |
| EP | 0 665 670 A2 | 8/1995 | |
| WO | WO 94/23377 | 10/1994 | |
| WO | WO 96/25801 | * 8/1996 | 17/30 |

OTHER PUBLICATIONS

Rochkind, Marc. J., "The Source Code Control System", IEEE Transactions on Software Engineering, vol. SE–1, No. 4, Dec. 1975.
File Verification Using CRC; Dr. Dobb's Journal; May 1992.

* cited by examiner

*Primary Examiner*—Hosain T. Alam
(74) *Attorney, Agent, or Firm*—Burns, Doane, Swecker & Mathis, L.L.P.

(57) ABSTRACT

A checkpoint which describes a base file is produced by dividing the base file into a series of segments; generating for each segment a segment description; and creating from the generated segment descriptions a segment description structure as the checkpoint. The segment descriptions represent segments of the base file at a minimum level of resolution sufficient to represent distinctly the segment. A difference file which defines differences between an updated file and the base file is produced by generating at different levels of resolution segment descriptions for segments in the updated file and comparing the generated segment descriptions with segment descriptions in the checkpoint to identify matching and non-matching segments. Data identifying segments in the updated file that match segments in the base file and data representing portions of the updated file at a minimum level of resolution sufficient to represent distinctly the portion are stored as the difference file.

17 Claims, 12 Drawing Sheets

| Segment Description Type | Type Code | Binary Type Codes | Lossey Image Bytes | Signature Bytes | Total Bytes |
|---|---|---|---|---|---|
| Represents a S.D. in the lowest plane of resolution in which it appears | L | 00 | 2 | 4 | 6 |
| Represents a S.D. acting as the root of a higher resolution tree | H | 01 | 2/0 | 0 | 2/0 |
| Represents a S.D. appearing only in a lossless (signature sorted) tree | S | 10 | 0 | 4 | 4 |
| Terminates the S.D. node in a tree | X | 11 | 0 | 0 | 0 |

FIGURE 10

METHOD OF PRODUCING A CHECKPOINT WHICH DESCRIBES A BOX FILE AND A METHOD OF GENERATING A DIFFERENCE FILE DEFINING DIFFERENCES BETWEEN AN UPDATED FILE AND A BASE FILE

TECHNICAL FIELD

The invention relates to a method of producing a checkpoint which describes a box file and a method of generating a difference file defining differences between an updated file and a base file. The invention can be applied for example to network systems where a remote copy of a file is kept up-to-date by the transmission and application of the differences between the successive versions of the local copy, thereby using bandwidth more efficiently. This includes modern on-line backup and data replication systems, and network computer systems that enable applications to transmit only the changes to memory-loaded files from client to server on successive save operations. The invention can also be applied for example to backup subsystems, where storing only a difference to files can make more economical use of storage media.

BACKGROUND OF THE INVENTION

Methods that determine how to transform one file into another have long been of interest to computer scientists. Today, many such methods exist. Capital is made from the fact that generated descriptions of a transformation can usually be made smaller than the would-be transformed file. In the main, therefore, these techniques are applied to files that are successively modified. Both a base and an updated version of a file is taken, and a description of how to transform the base file into the updated version is generated. Such descriptions of incremental transformation are used for things like reducing the expense of storing file histories and for keeping remote copies of changing files up-to-date.

Source code control systems provide some of the earliest examples of such difference or transformation calculation techniques in practice. These systems are used in software projects to keep version histories of textual source code files, which are likely to be modified many times over their lifetime. As storage space is at a premium, it is prohibitively expensive to store the large number of successive versions of each file whole. Instead, the typical solution is to store the first version of a file and thereafter only record only the line by line difference between following versions. When a programmer makes a request for a particular version of a file, the system takes the earliest version of the file, which is stored whole, and sequentially applies the successive differences between the versions until the earliest version has been transformed into the requested version. An early description of such a system can be found in a technical paper by M. J. Rochkind, titled "The Source Code Control System", IEEE Transaction on Software Engineering, Vol SE-1, No. 4. December 1975, PP 364–370.

Rochkind's system describes differences by the line of text, but more modern techniques describe differences at the level of individual bytes. These techniques have found important application on networks where transmission of data is expensive. As a way of saving bandwidth, particularly over modern lines and the Internet, updates to files are often distributed as descriptions of byte level differences, or binary patches, from previous versions. Such a technique is widely used in the distribution of updates to software packages. Here vendors often want to update executable files installed on users' computers because a security flaw or some other problem has been discovered. Rather than asking them to download updated versions of the affected files whole, binary patches representing a minimal description of how the old file versions need to be modified are generated. The binary patches are then made available for downloading and users can quickly obtain and apply them to transform the problem files into the revised versions.

Despite the widespread use of the aforementioned traditional patching techniques however, they have proved inadequate for some new types of network application. Problems have arisen with the need to have both the base and updated versions of files to hand to calculate differences. The new applications often need to transfer only the difference between successive versions of files to economize on bandwidth, but cannot afford the expense associated with storing local copies of both the base and updated versions of every file. An example of such a situation occurs in the newly emerging field of on-line backup systems. Here backup servers store copies of large numbers of clients' files, and these typically have to be kept up-to-date using a slow connection available for data transfer. Some backed-up files, such as mailboxes, may be tens of megabytes in size yet change regularly by only a few kilobytes on each modification. In such cases, it is only practical to transmit the difference between the last stored copy of the file and its latest version on each backup. But implementing this scheme utilizing traditional techniques necessitates clients keeping local copies of the last transmitted versions of backed up files. This means that the space consumed by backed up files is effectively doubled.

The problems arising from applying traditional patching techniques to on-line backup systems can be witnessed in those that use them. Such a system is described in U.S. Pat. No. 5,634,052 issued on May 27, 1997 to Robert J. T. Morris and assigned to International Business Machines Corporation. Hot Wire Data Security, Inc. has implemented a similar system called BackupNet (www.backupnet.com). In these systems the client actually keeps copies of the last versions of files that have been transferred to the server in a cache. On the next backup, these are used to generate patches for modified files that need to be updated on the server. When the technique finds a match in the cache it can generate minimal size patches because it has both base and updated file versions to hand. But unfortunately storage restrictions on typical machines constrain caches to holding only a fraction of the files assigned to the backup system, especially where large files are involved. Therefore even if files can be entered and deleted from the cache on an accurate most-likely-to-be-modified basis, numerous cases always occur where an entire updated file, rather than just a patch, has to be transmitted.

A new class of patching technique, has evolved to reduce dramatically the number of aforementioned cache misses. In techniques of the new class, special difference checkpoint data is derived from the base file that can later be substituted for it during patch generation. Checkpoints are designed to consume only a tiny fraction of their corresponding base file's storage, but still contain sufficient information to allow a binary patch to be calculated with good efficiency. A basic tradeoff often exists, where the smaller checkpoints are, and the less information they hold, the more inaccurate the difference calculation and the larger the size of the generated patch. But the tradeoff can be balanced according to the situation and so better solutions can usually be achieved than with traditional methods. A description of a checkpoint-based patching technique can be found in U.S. Pat. No.

5,479,654 issued on Dec. 26, 1995 to Squibb and assigned to Squibb Data Systems, Inc. An example of such a technique in practice can be found in Connected Corporation's Delta Blocking technology, as used in their Connected On-line Backup system (www.connected.com).

Difference checkpoints can be constructed in many ways, but at the time of writing all are based upon digital signatures. Represented files are divided into equal sequential segments, and a digital signature is calculated for each and stored in the checkpoint. The signatures require only a very small amount of space to store, but perform a fingerprinting function that allows the bytes in a segment to be uniquely identified beyond a reasonable doubt. One popular signature that has been standardized by the CCITT is the 32 bit CRC, a discussion of which can be found in a technical article by Mark Nelson titled "File Verification Using CRC", Dr Dobb's Journal May 1992. Each 32 bit CRC consumes four bytes of storage, so if a segment size of one kilobyte is chosen checkpoints can be constructed that consume only one per cent of their corresponding file's size. However, by searching a file for segment lengths of bytes with signatures matching those stored in the checkpoint, blocks of bytes can be identified that are present in the represented file. The tradeoff can be seen to be that the smaller the segment length chosen, the more accurately the difference can usually be calculated, but the more signatures generated and the more space needed to store the checkpoint. In practice though, using a standard segment length of 512 bytes where medium to large files are involved results in patches being calculated that are only one or two percent larger than those calculated with traditional techniques.

However, while checkpoint stored signatures provide a means to match segments in an updated file with segments in a base file, they cannot provide a satisfactory solution on their own. Segments of bytes in an updated file that have signatures matching those of sequential base file segments may occur at any offset and in any order. Therefore without any supplementary method, only a prohibitively expensive route for finding every identifiable segment is available. This must involve calculating the signature of a segment's length of bytes following every offset in the updated file, and checking whether it matches a signature in the checkpoint. It is quite reasonable to increment the offset in the updated file by a segment's length when a matching segment is found, so when the base and updated files are identical only as many signatures will be calculated as sequential segments they hold will be calculated. But in the worst case where the files share no reused segments, almost as many signatures will be calculated as there are bytes in the updated file. As signature calculations involve passing every byte in the respective segment through a complex function, it is clear that the computational complexity of the worst case is far too great.

To reduce the aforementioned computational complexity, some techniques simply avoid trying to identify every reused segment possible. In its simplest form, this involves assuming that if the updated file contains segments from the base file, then they will be present at the offset at which they were originally sequenced. Signatures are calculated for sequential segments in the updated file and then compared directly with the checkpoint-stored signature of the equivalent sequential segment in the base file. This ensures that only as many signatures as there are sequential segments in the updated file are calculated. As a consequence of this approach though, these techniques fall down even in the simple case where a file is modified by the insertion of data. In such a case where a base file has a single byte prefixed to the beginning, thereby altering all of the segment alignments, no matches will be found and a patch is calculated that is the same size as updated file. Because of this methodology's inability to deal with the majority of file modifications, it is generally considered inadequate. Instead, techniques have centered upon checking for matches at each possible offset, by finding ways of discounting non-matching segments before having to calculate their signature.

The preferred method of improving the efficiency of patch generation is to supplement checkpoints with data extraneous to the fingerprint matching process. Such data is included purely for the improvement of efficiency and it is not responsible for the final identification of reused segments. Squibb's technique manifests such an approach and places three different but increasingly expensive types of signature in the checkpoint, only the most expensive of which is used to irrefutably identify segments. The signatures consist of an XOR of a subset of bytes from the segment, a 16 bit CRC of all the bytes in the segment, and finally a 32 bit CRC of all the bytes in the segment. At each offset in the provided file where he believes a segment from the represented file may be found, he first calculates the relatively inexpensive XOR. Only if a match is found does he proceed to calculate the more expensive 16 bit CRC, and if that matches, the still more expensive 32 bit CRC. The XOR test quickly discounts most segments that have big differences. The 16 bit CRC that is calculated next discounts most segments that don't have big similarities. Hence the most expensive signature, the 32 bit CRC, is only calculated in cases where a strong probability exists of a match being found delivering a big increase in general efficiency.

However, techniques, such as Squibb's, that construct efficiency enhancing data in the checkpoint from some fixed range of relatively inexpensive signatures still suffer a number of deficiencies. One deficiency is that such techniques cannot adapt their derivation of efficiency data according to different file types or particular patterns within files. Files containing long stretches of the same byte, those containing regular patterns of bytes and those comprising a small subset of bytes cause inordinately frequent matching of the less expensive signatures where the segments differ, thereby causing large numbers of unnecessary calculations of the most expensive signature. Another deficiency is that the user cannot stipulate the amount of efficiency enhancing data to be derived for a file, say to reflect the likelihood of it being modified and therefore requiring updating in an on-line backup system. A further deficiency is that given some arbitrary limit upon the amount of efficiency data that may be derived, maximum performance is not achieved. The present invention addresses these deficiencies by utilizing a multi-dimensional hierarchical representation of efficiency data that is derived at variable rates of "resolution".

SUMMARY OF THE INVENTION

In one aspect the invention provides a method of producing a checkpoint which describes a base file, the method comprising: dividing the base file into a series of segments; generating for each segment a segment description wherein each segment description comprises a lossless signature and a plurality of lossey samples each describing the segment at a different level of resolution; and creating from the generated segment descriptions a segments description structure as the checkpoint, wherein the segments description structure is created by selecting for each segment from among the plural lossey samples and the lossless signature a description that adequately distinguishes the segment to the lowest level of resolution.

In another aspect the invention provides a method of producing a morph list that defines an updated version of a base file with reference to the base file and a check point for the base file which check point is produced according to the first aspect of the invention, the method of producing a morph list comprising: defining a first segment at a start position in the updated file; generating a segment description for the first segment; comparing the segment description for the first segment with segment descriptions of the check point; and if a match is found, adding the matched segment description to the morph list and, if no match is found adding data in the first segment to the morph list.

The invention also provides a method of generating a difference file defining differences between an updated file and a base file, the method comprising: generating a checkpoint according to the first aspect of the invention defining characteristics of the base file in terms of multiple segment descriptions each selected to represent a respective segment of the base file at a minimum level of resolution sufficient to represent distinctly the segment; generating at different levels of resolution segment descriptions for segments in the updated file and comparing the generated segment descriptions with segment descriptions in the checkpoint to identify matching and non-matching segments; and storing as the difference file data identifying segments in the updated file that match segments in the base file and data representing portions of the updated file at a minimum level of resolution sufficient to represent distinctly the portion.

As will become clear from the description that follows, the invention offers several advantages over hitherto known approaches. The invention enables checkpoints to be composed from signatures that identify segments and data that enhances difference generation efficiency, and thus to adaptively derive the efficiency enhancing checkpoint data according to the base file type to achieve better performance. The invention enables the efficiency enhancing data contained in the checkpoint to be hierarchically derived and stored so as to minimize the required storage size. The invention enables representations of differences to be generated as efficiently as possible, given any arbitrary limit on checkpoint size. The invention can be applied to networks and can reduce network transmission cost in a variety of network applications. The present invention also enables the storage requirement in the backup subsystem of a client-server system to be reduced.

Briefly stated, special checkpoint data is derived from a base file. The checkpoint contains signatures taken from, and uniquely identifying, the sequential segments of the base file. The checkpoint also contains efficiency data, designed to make the following process more efficient. A modified version of the base file (also referred to as the new version of the base file or changed version of the base file or updated version of the base file) is presented. A description of the difference between the base file and the updated file is generated that describes the updated file in terms of new bytes and segments that are also present in the base file.

Checkpoint efficiency data (also referred to as image data) is derived (also referred to as sampled) to hold varying amounts of information about associated base file segments. The amount of data held (also referred to as the resolution) is increased or decreased during checkpoint derivation in an attempt to elicit distinguishing detail from the base file segments represented. The image data is hierarchically derived and stored in such way that it occupies a similar amount of space as though it had been sampled at the lowest resolution throughout. During generation of the difference representation, the image data is used to determine whether or not to make expensive signature calculations. Because more information is contained within the hierarchical representation of the image data, the method is able to calculate whether to make signature calculations with a greater degree of accuracy, thus improving general efficiency. Because sampling resolution is increased to find distinguishing segment detail where necessary, a degree of adaptation to different file types is provided, thus reducing the number of file types that can produce unusually poor performance.

The above and further features of the invention are set forth with particularity in the appended claims and together with advantages thereof will become clearer from consideration of the following detailed description of an exemplary embodiment of the invention given with reference to the accompanying drawings.

BRIEF DESCRIPTION OF THE DRAWINGS

In the drawings:

FIG. 10 is a table showing the storage space consumed by segment descriptions when stored in a checkpoint;

DETAILED DESCRIPTION

In the following specific description a method is disclosed of using a special checkpoint representation of an initial or base file to calculate how to transform it into an updated or provided file. The checkpoint contains less data than the file represented thereby, thus making the method ideal for situations where one file cannot be present during patch calculation due to memory or storage restrictions. The checkpoint contains two types of data derived from sequential blocks in the represented file. This consists of signatures that uniquely identify each sequential block and lossey image data that approximates their shape.

The resolution at which image data is extracted for individual blocks is varied in order to capture their distinguishing features. However the image data is hierarchically represented so that it requires only marginally more storage than if the lowest level of resolution had been used throughout. The method involves loading the checkpoint data into a search structure that comprises multi-dimensional hierarchies of trees, with each tree comprising structures sorted on image data extracted for successive levels of resolution.

The method then involves moving incrementally through the provided data file. At each offset the method scans the search structure for blocks described in the checkpoint whose shape matches that of the following block of bytes in the file. If there is no match, then a byte unique to the provided file has been found. If there is a match, the method next involves calculating the signature for the next block in the file.

If the signature matches the matching checkpoint description, the method knows that it has found a block in the provided file that exists in the represented file and continues searching just beyond it. This process continues until a description of the provided file has been created in terms of unique bytes and blocks from the represented file. High efficiency is delivered because signatures, which are expensive to calculate, are only calculated for blocks in the provided file when matching image data indicates a high probability of equivalence being found. Fewer signature calculations are made than if the image data had been sampled at a single resolution. Further, the method extracts image data in a way that provides a degree of adaptation to different file types, thus reducing the number of poor performance cases where many unnecessary signature calculations have to be made.

Figure 1:
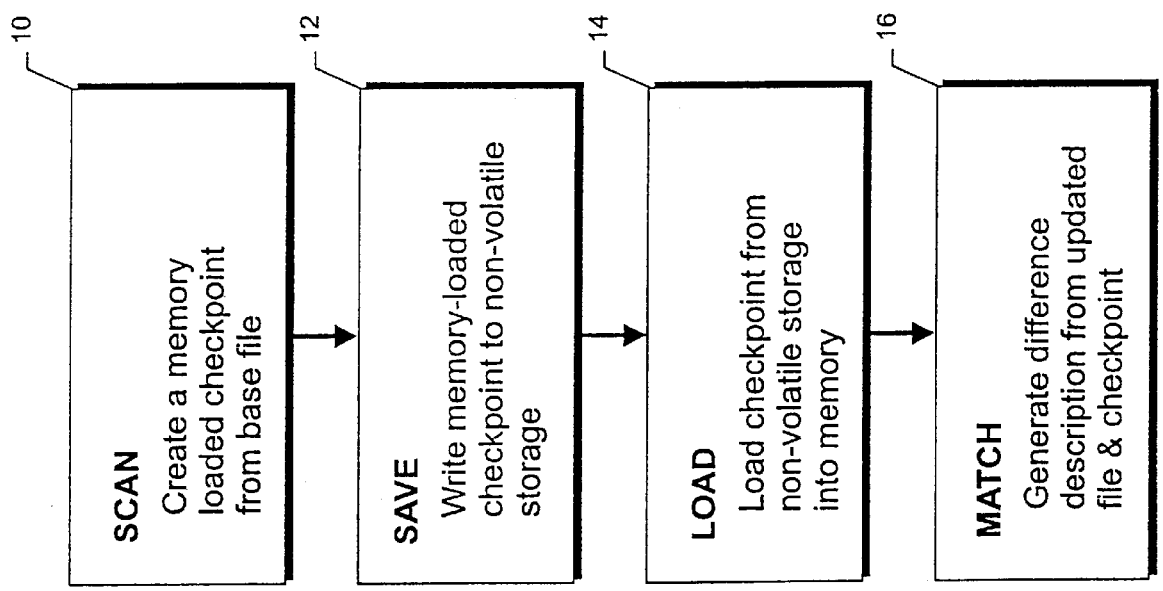
FIG. 1 is a flow chart showing a series of procedures embodying the invention.

As shown in FIG. 1 of the accompanying drawings, the invention may be embodied in four separate programs that are run sequentially to generate a description of the difference between two successive versions of a file. The first program, hereafter called the SCAN program 10, scans a base file to produce a memory-loaded checkpoint. The second program, hereafter called the SAVE program 12, is optional and writes the memory-loaded checkpoint to non-volatile storage. The third program, hereafter called the LOAD program 14, is also optional and is used in conjunction with the SAVE program 12 to load a checkpoint from non-volatile storage into memory. The fourth program, hereafter called the MATCH program 16, scans through an updated version of the base file in conjunction with a memory-loaded checkpoint and generates a description of the updated base file in terms of unique bytes and segments of bytes that can be found in the original base file.

Figure 2:
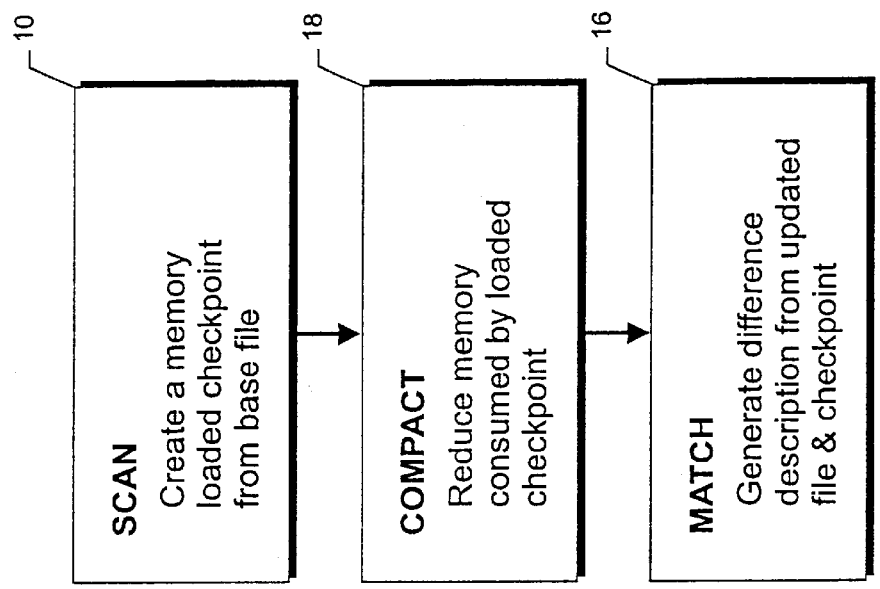
FIG. 2 is a flow chart showing another, simplified series of procedures embodying the invention.

Generally, if the period of time between execution of the SCAN and MATCH programs 10, 16 is large, then the SAVE and LOAD programs 12, 14 will be included in the execution sequence, as shown in FIG. 1. If on the other hand the aforementioned period is small, these programs 12, 14 may be excluded. As shown in FIG. 2, a program, hereafter called the COMPACT program 18, may be run in their place to reduce the memory consumed by the loaded checkpoint.

The data in a base file may represent anything from financial data to news reports, computer program to electronic images. The concepts underlying the invention may be more easily understood if the data is considered to represent an electronic image. In the following therefore the operation of the various programs will be described as if the data in the base file is of an image. Those possessed of the appropriate skills will appreciate that the invention is not limited to the processing of image files and is equally applicable to any file containing digital data regardless of what that data represents.

Figure 3:
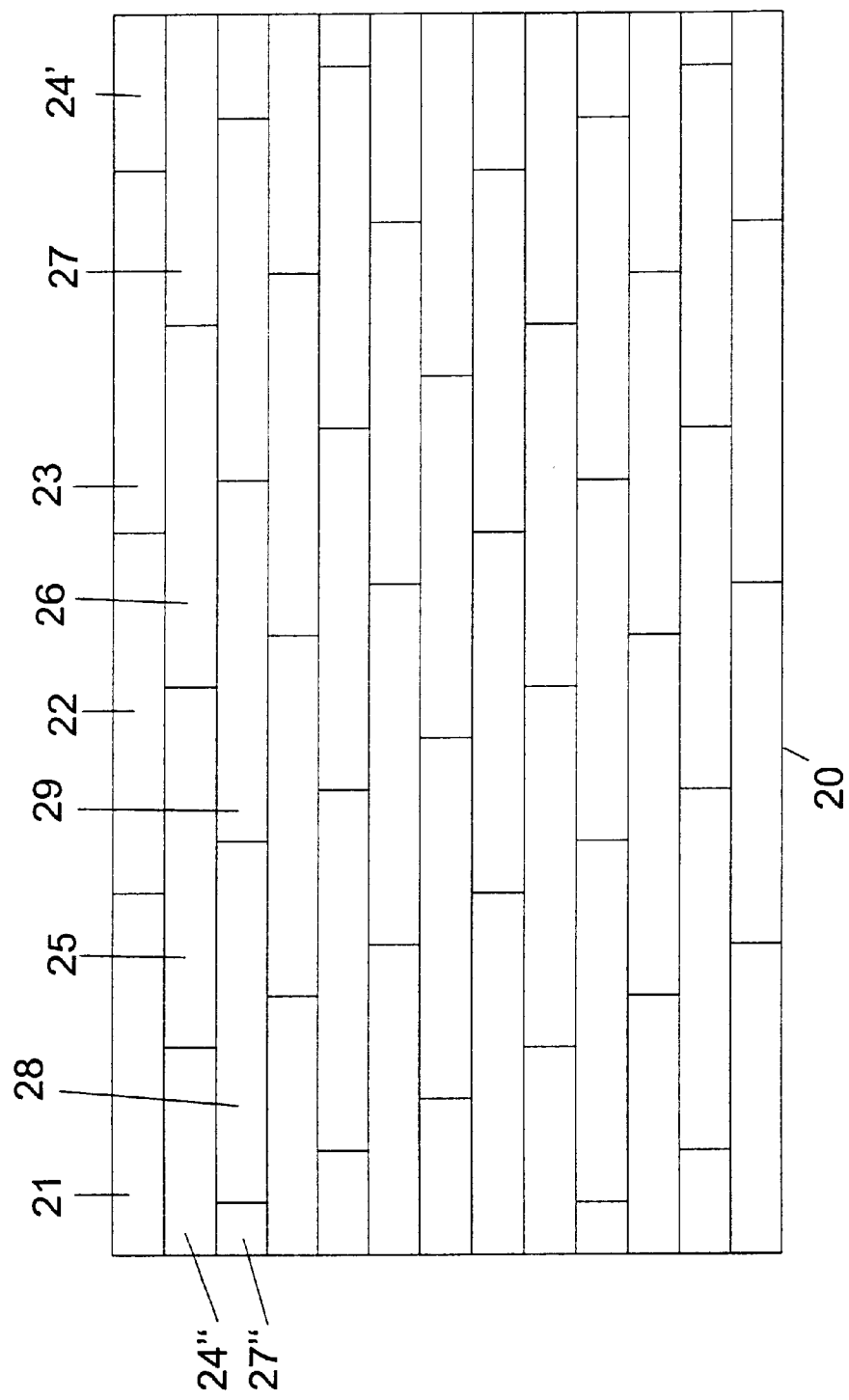
FIG. 3 is a representation of an image divided into segments.
Figure 4:
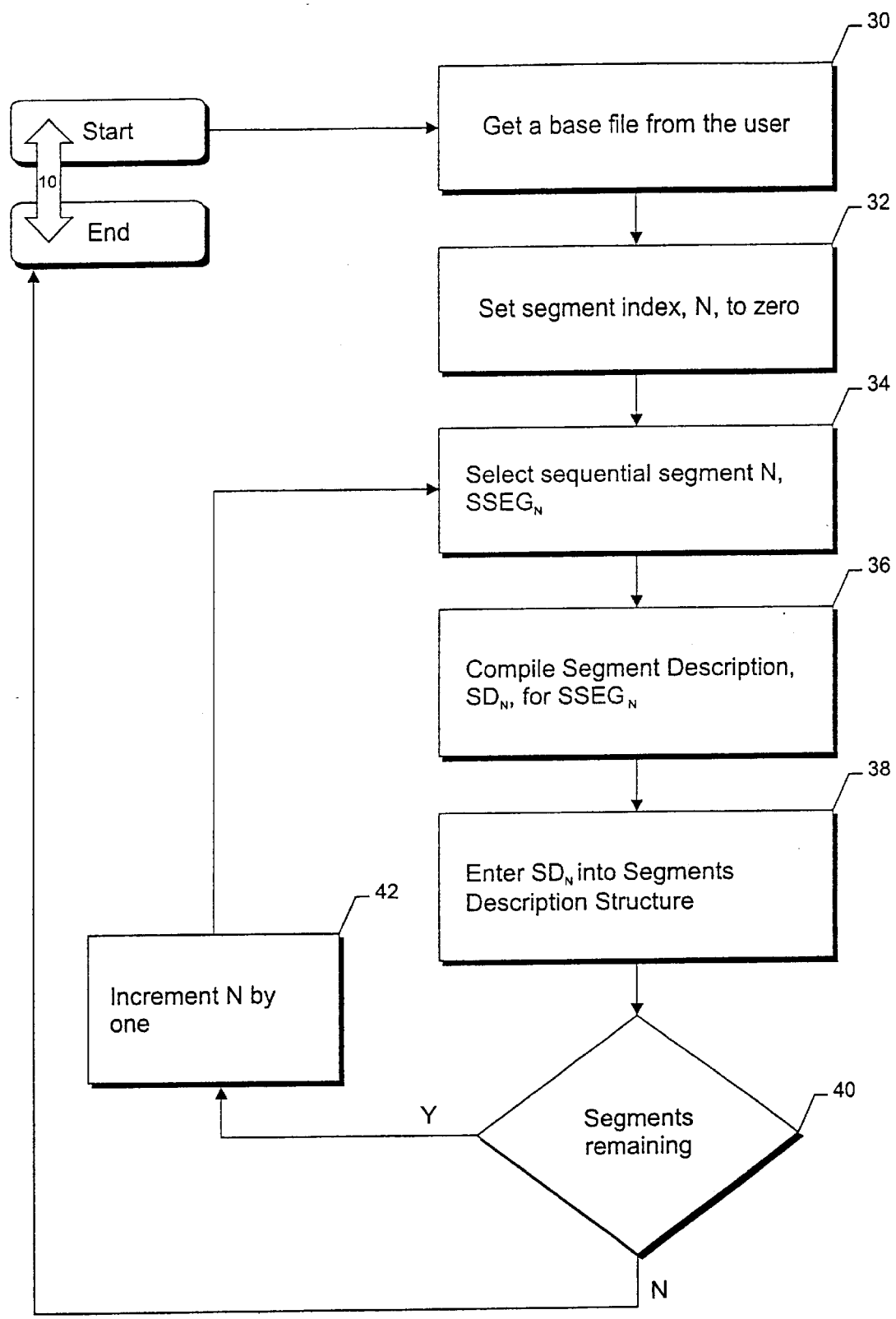
FIG. 4 is a flow chart showing a high level representation of a routine for scanning a base file.

FIG. 3 of the accompanying drawings shows an image 20 represented by data in a base file. As will be explained in the following, the SCAN program 10 divides the data representing the image into a series of image segments 21 to 29 of equal length. The length of each segment need not be governed by the size of the image. Thus, for example segments 24 and 27 both comprise an end portion 24', 27' of one line start portion 24", 27" of the next line. The SCAN program 10 is shown in more detail in FIG. 4 of the accompanying drawings. The SCAN program 10 works sequentially through a base file obtained from a user at step 30 (hereafter a "provided base file"), processing each sequential segment in turn, as represented by the blocks 32, 34, 36, 38, 40 & 42. For each segment the SCAN program creates at step 36 a segment description describing the segment. Next, at step 38, the SCAN program enters the segment description into a segments description structure, which describes the base file.

Figure 5:
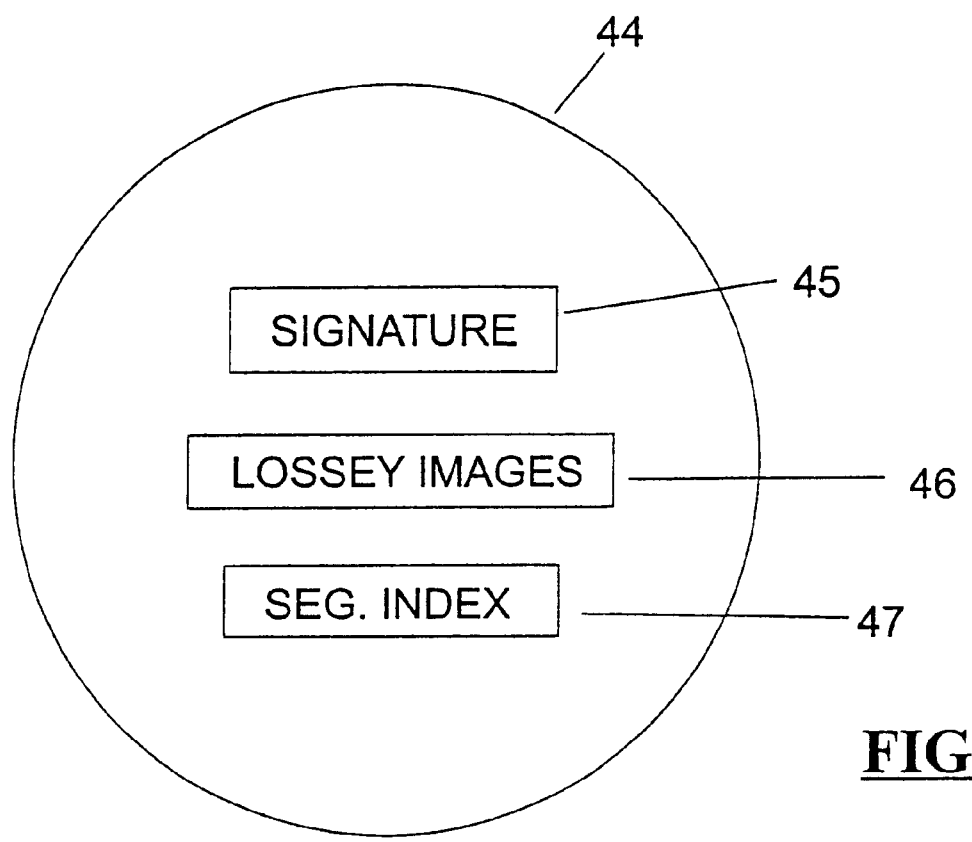
FIG. 5 shows an example of data in a Segment Description.
Figure 6:
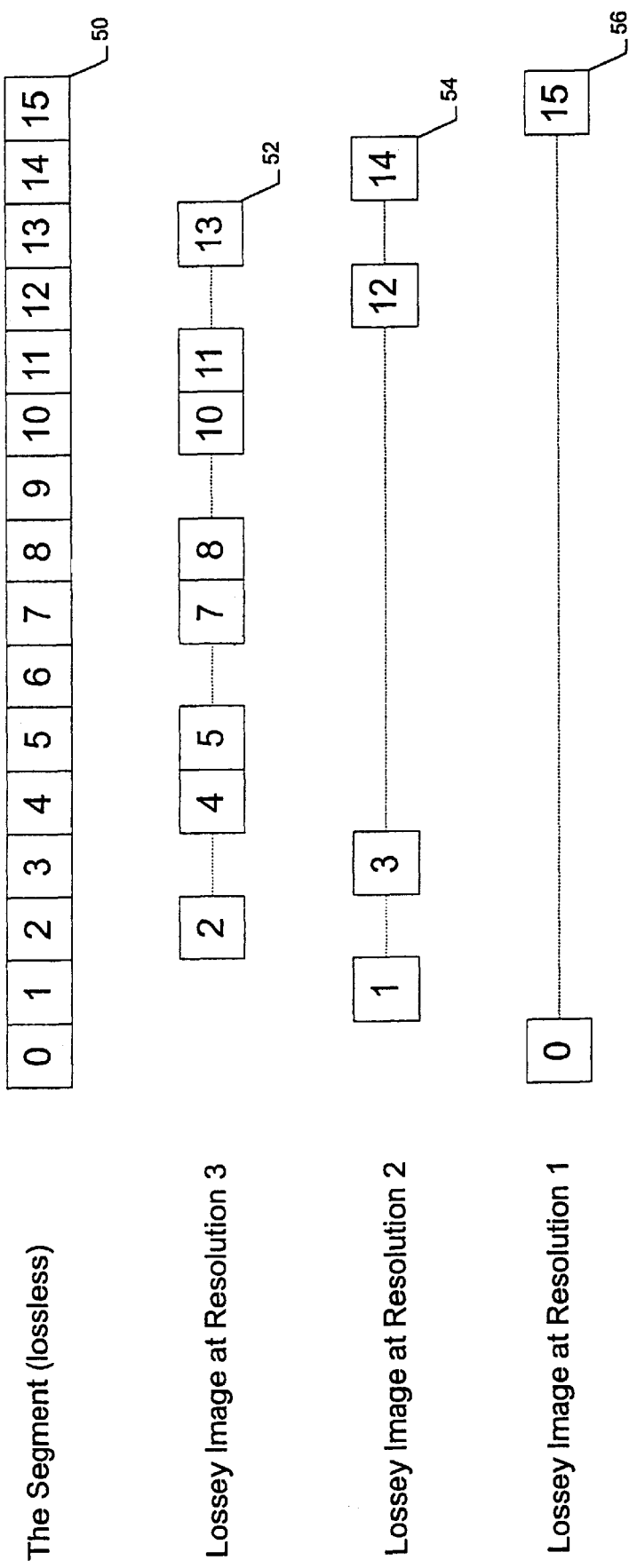
FIG. 6 shows an example of a multi-level incremental lossey image bytes sampling scheme.

As shown in FIG. 5 of the accompanying drawings segment description 44 is composed from a combination of a signature 45 that uniquely identifies the bytes in the segment, such as a cyclic redundancy check (CRC), and a lossey sample 46 comprising bytes sampled from the segment according to a sampling scheme. The segment description 44 also comprises a segment index 47 identifying where the segment appears in the sequence. For example, in FIG. 3 segment 21 would have an index of "0", segment 22 an index of "1", segment 23 an index of "2" and so on. The idea is that bytes can be sampled from the segment in a series of increments, thus creating lossey representations of the segment across a range of resolutions. There are several ways in which this may be done. One way is shown in FIG. 6 of the accompanying drawings. As shown in FIG. 6 the SCAN program 10 initially creates from a segment 50 a lossey image 52 by sampling at a maximum level of resolution, chosen by the user. Increasingly, lossey images 54, 56 at successively lower levels of resolution are constructed by the incremental removal of sampled bytes from the level above. The segment description therefore effectively holds images sampled throughout a range of resolutions from lossless down to the most lossey, lowest level of resolution.

In FIG. 6, the segment 50 is shown as having a length of 16 bytes. Three levels of resolution are also shown. This is only to simplify the drawing. In practice a segment length of 512 bytes would be more realistic, and 16 levels of resolution would be more typical. The bytes contained in the segment 50 provide a lossless representation of the image segment. At the next level down, a lossey sample 52 is created by sampling the lossless segment 50 at the maximum sampling resolution, in this case resolution 3 corresponding to six out of the 16 bytes of the lossless segment. This lossey segment 52 comprises a subset of the bytes contained in the segment 50. Bytes from the least lossey, i.e. highest resolution sample 52 are used to create further lossey images 54, 56 at lower resolutions.

The purpose of creating a range of image samples at different resolutions is to create a set of signatures or samples of the segment that may be used to represent the segment. Thus, the set of signatures or samples enable a segment to be described across a range of resolutions, from lossless reproduction of the image from the signature down to a lossey reproduction of the image sample at the lowest resolution. Initially the SCAN program constructs segment descriptions that hold data comprising lossey images across the full range of possible resolutions. Plainly, however, keeping all samples for each signature would consume large amounts of memory by creating a checkpoint larger than the file that it represents. The SCAN program 10 therefore also creates a Segments Description Structure in which signature and lossey sample data is removed from the segment descriptions of the base file. That is to say, the Segments Description Structure enables as much of that data to be removed as possible.

Figure 7A:
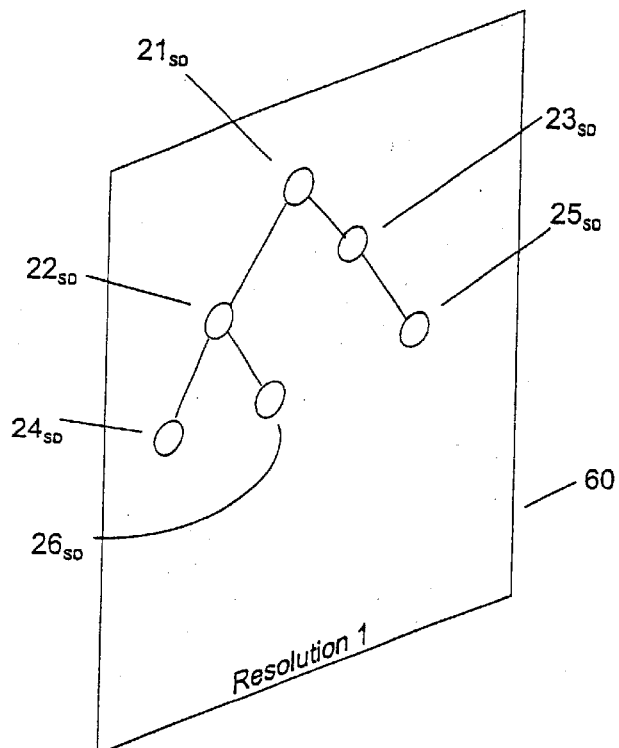
FIG. 7 shows (a) construction of a segment description structure in a first level of resolution, and (b) construction of the segment description structure in two levels of resolution.

Upon initial construction, segment descriptions are placed into a Segments Description Structure that uniquely distinguishes each using a minimum of resolution, thereby enabling redundant data to be deleted. FIG. 7 of the accompanying drawings illustrates how the Segments Description Structure is created by stage 38 of the SCAN program 10. Reference will be made first to FIG. 7(a) which shows a binary tree of segment descriptions $21_{SD}$ TO $26_{SD}$ at the lowest level of resolution (Resolution 1). The tree is constructed starting with segment 21 (see FIG. 3) by entering the most lossey sample (e.g. sample 56 in FIG. 6) as the segment description $21_{SD}$ at the lowest level of resolution (Resolution 1) represented by plane 60 in FIG. 7(a). Next, the most lossey sample of segment 22 (see FIG. 3) is compared with the segment description $21_{SD}$. Any suitable comparison that gives a "less than", "equal to" or "greater than" result may be used. Thus, a simple comparison of the numerical values represented by the data would be sufficient. Of course, more complex comparisons may be used if desired. In FIG. 7(a) the value of the segment description $22_{SD}$ is less than that of the segment description $21_{SD}$. This is represented in FIG. 7(a) by the segment description $22_{SD}$ being placed to the left of the segment description $21_{SD}$. The value of $23_{SD}$ is greater than $21_{SD}$ and therefore is represented as being placed to the right of $21_{SD}$. Continuing through the tree in FIG. 7(a), the value of $24_{SD}$ is less than that of $21_{SD}$ and $22_{SD}$, and is placed in the tree to the left of and below $22_{SD}$. The value of $26_{SD}$ is greater than that of $21_{SD}$ and $23_{SD}$, and is placed to the right of and below $23_{SD}$. The value of $26_{SD}$ is less than that of $21_{SD}$ but greater than that of $22_{SD}$, and $26_{SD}$ is therefore placed to the right of and below $22_{SD}$. Thus, the first six segments 21 to 26 of the image are adequately defined by a tree of segment descriptions $21_{SD}$ to $26_{SD}$ at the lowest level of resolution.

Figure 7B:
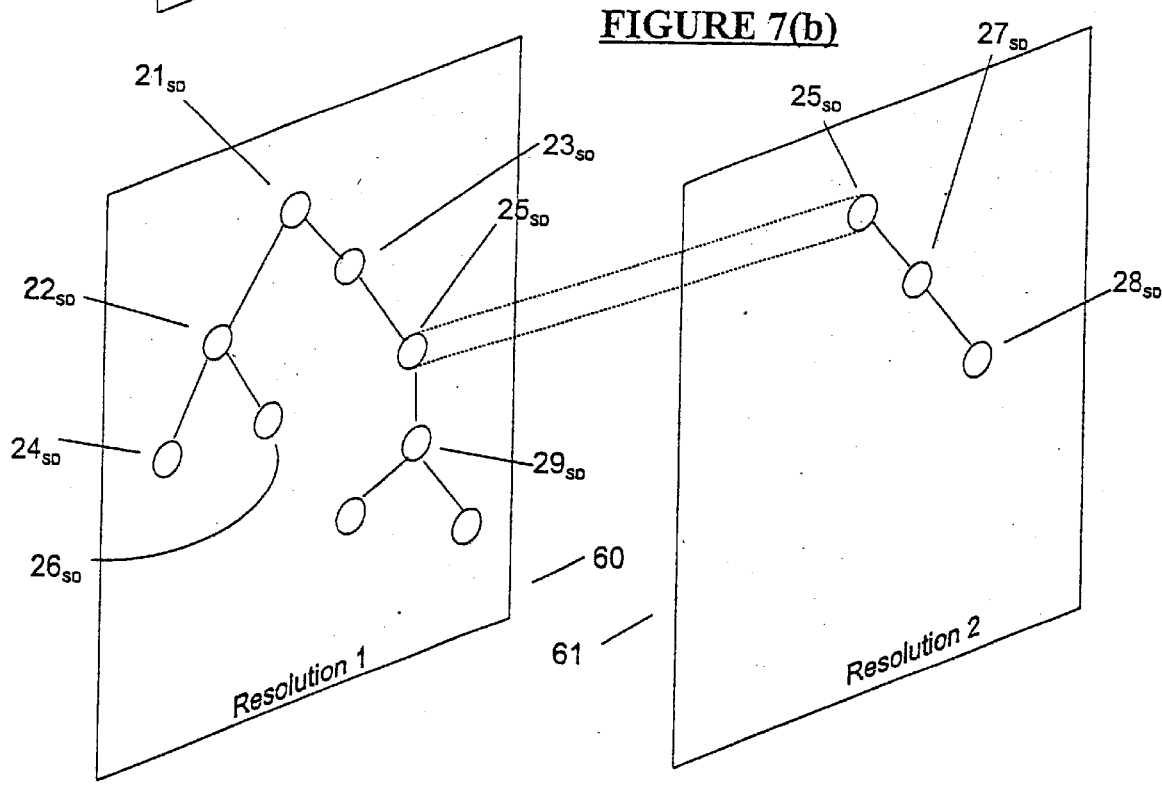

However, when the SCAN program 10 reaches the segment description $27_{SD}$, it is found to be equal to that of $25_{SD}$. It is thus not possible to define segment 27 distinctly at the lower level of resolution. Instead, therefore, the lossey sample at the next highest level of resolution (resolution 2) is selected to represent the segment 27. This is represented in FIG. 7(b) by the segment description $27_{SD}$ being placed in place in plane 61. Similarly, for segment 28 the segment description $28_{SD}$ is greater than $21_{SD}$ and $23_{SD}$, is equal to $25_{SD}$, and is greater than $27_{SD}$. The description $28_{SD}$ is therefore represented in FIG. 7(b) as being placed in plane 61 below and to the right of $27_{SD}$. Segment 29 is adequately defined by the most lossey sample (at resolution 1). The segment description $29_{SD}$ is greater than $21_{SD}$ and $23_{SD}$ and less than $25_{SD}$. The segment description $29_{SD}$ is therefore represented in FIG. 7(b) as being placed in plane 60 below and to the left of $25_{SD}$.

Figure 8:
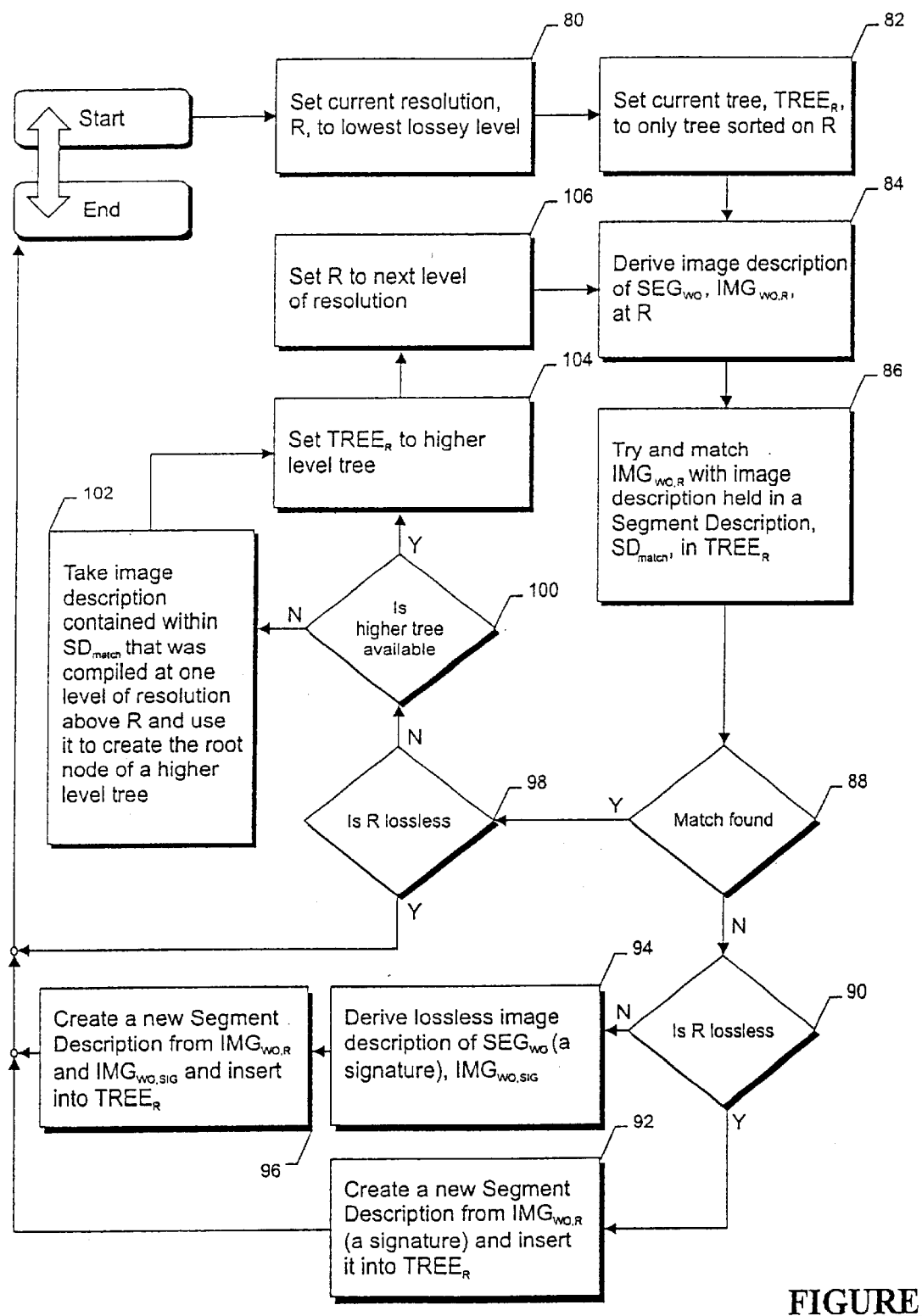
FIG. 8 is a flow chart showing part of the flow chart of FIG. 4 in greater detail.

The scan program 10 continues to add segment descriptions to the segments description structure in the manner described until descriptions for all segments of the image have been placed in the structure. FIG. 8 of the accompanying drawings is a flow chart showing in greater detail how the process represented by block 38 in FIG. 4 and described with reference to FIG. 7 enters a segment description into the Segments Description Structure. Resolution can range from the lowest lossey resolution up to the lossless (signature based) resolution. First in step 80 the current resolution is set to the lowest lossey level and in step 82 the current tree is set to the single root tree that is sorted on that resolution (which will be empty upon insertion of the first Segment description). Next, in step 84, an image description of the segment of bytes at the current working offset is compiled at the current level of resolution. The working offset WO is simply the segment index which identifies where the segment appears in the segment sequence. An attempt is made in step 86 to match it against a Segment description in the current tree. If a match is not found—as represented by decision 88—and therefore a unique place in the tree is available, a check is made at decision 90 as to whether the current resolution is lossless. If the current resolution is lossless, then in step 92 a new Segment description is created using the current segment's signature, which is entered into the tree, and the process returns.

If on the other hand the current resolution is lossey, then in step 94 the current segment's signature is first calculated. Then, in addition to the lossey image description already calculated for the current resolution in step 84, lossey image descriptions are compiled for any lossey resolutions above the current resolution. The combined lossey image descriptions and the signature are then used aggregated to create a new Segment description that is duly entered into the current tree at step 96 and the process returns.

If a match had been found in the current tree at decision 88, a check is made at decision 98 as to whether the current resolution is lossless. If the current resolution is lossless then a Segment description describing the current segment's byte pattern (albeit in a different segment) is already present and the process simply returns. If alternatively the current resolution is lossey, then more resolution exists to elicit a difference and a check is made at decision 100 as to whether the matching Segment description already exists on a higher plane of resolution.

If this is the case, then at step 104 the current tree is set to the higher level tree of which the matching Segment description is root and at step 106 the current level of resolution is incremented. The method then returns at step 84 to compiling an image description at the current resolution. Alternatively, if at decision 100 a higher tree is not available, then at step 102 the image description contained within the matching Segment description that was compiled at the resolution one above the current resolution is taken and used to form the root of a tree sorted upon that resolution. The process then continues at step 104 as previously described.

Figure 9:
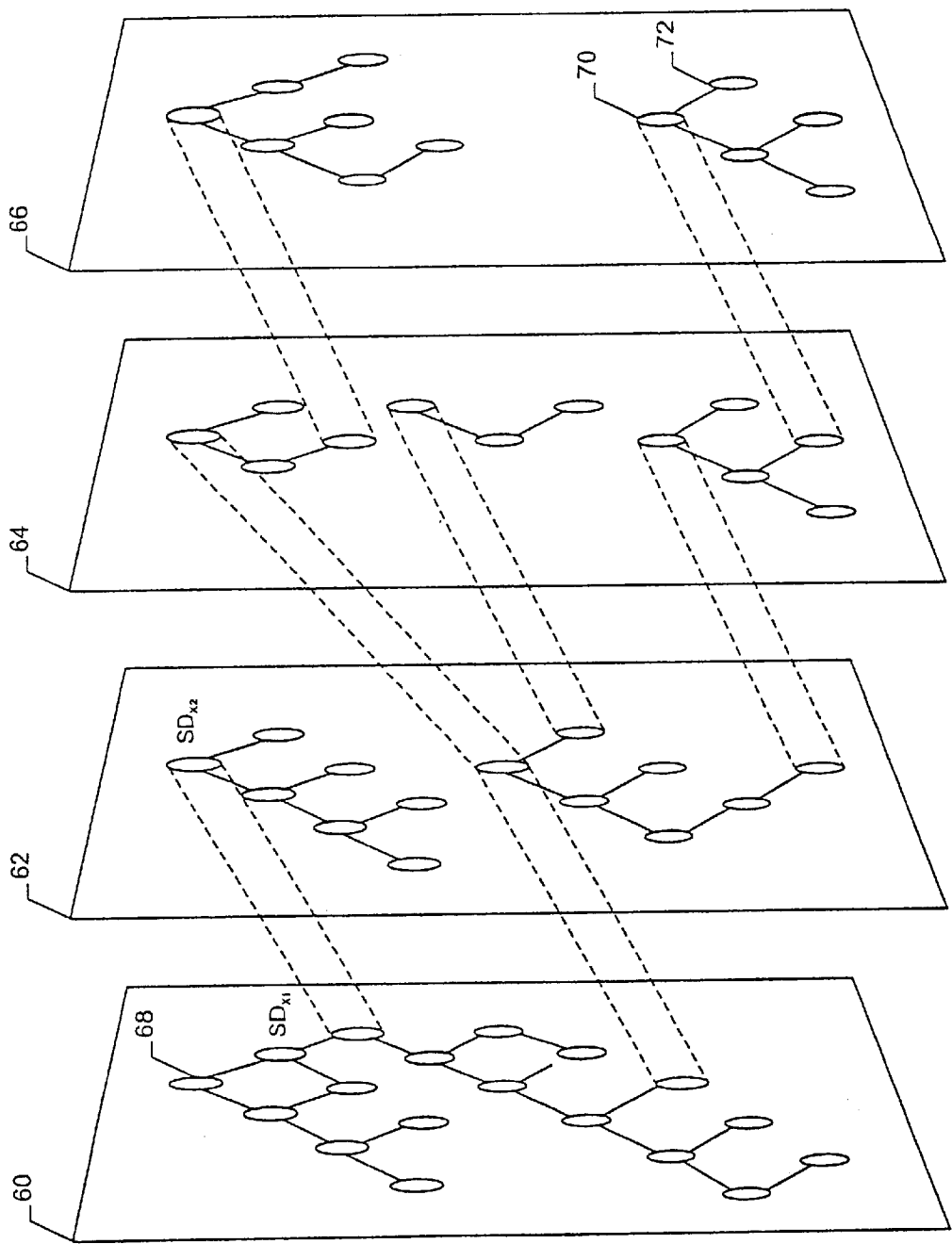
FIG. 9 shows an example of a segments description structure where three levels of lossey resolution have been defined.

FIG. 9 of the accompanying drawings shows an example of a Segments Description Structure comprising a multi-dimensional hierarchy of binary trees of segment descriptions ordered by, and successively sorted on, successive levels of resolution 60, 62, 64, 66. In this example, all hierarchies share the same root 68, which is the root of the single tree that is sorted upon the bytes used to construct an image at the lowest level of resolution 60. The trees, which range from the single root tree sorted upon the lowest resolution 60, to trees sorted upon the signature 66, never contain segment descriptions with matching values. Instead, when a segment description is entered into the lowest resolution tree and a matching description is already in place, the matching description is taken to represent the root of a tree at the next level of resolution and the new segment description is thus entered into that tree. Segment descriptions can thereby be simultaneously present in successive planes of resolution as shown by nodes $SD_{x1}$ and $SD_{x2}$. This process continues recursively until either a unique place within a tree is found, or a matching description is found in a tree sorted on a lossless level of resolution 66. This indicates that the current segment's pattern of bytes has already been recorded and the segment description is simply discarded.

A feature of the segments description structures is that for each segment description placed in a resolution n sorted tree, the bytes that compose its lossey images at resolutions 1 to (n−1) are described by the root descriptions of trees higher in its tree hierarchy. This enables implementers to achieve memory space economies while constructing a structure, and then, after it is completed, when it is stored or compacted.

It will be appreciated from the foregoing description that during the construction of the Segments Description Structure a segment description may need to be made the root of a higher resolution tree upon insertion of another description. As this can happen repeatedly until a signature sorted tree is reached, the bytes needed to represent higher resolutions must be held by each description until the structure is completed. But no such restriction holds for the bytes representing image resolutions below that of the tree in which the description is initially placed as these are implied by root descriptions of trees higher in the hierarchy. Thus during construction, these bytes may be omitted from descriptions to achieve a significant space economy. However, a much greater and more significant economy can be achieved once construction of a segment description structure is completed. At this point insertion into the structure has ceased and segment descriptions no longer need to hold the bytes needed to make them the root of a new higher resolution tree. Therefore a new representation of the structure can be created, in which descriptions hold only the increment of bytes that distinguish the resolutions of the different trees in which they are present. However, because the great majority of descriptions appear only in one tree, even with unfavorable files, the total space required to represent a completed segments description structure is generally not much greater than that that would be required if only a single sampling resolution had been used.

The present invention is not limited to the aforementioned means of hierarchical representation of segment data, nor the aforementioned data sampling schemes, nor the aforementioned method for construction of lossey images. For example, it is conceivable that the trees within the aforementioned segments description structure might be replaced by a hashing scheme. Similarly, not only are many schemes for sampling image bytes possible, but a range of lossey images could be defined as constructed from a mathematical representation of sampled bytes as opposed to their simple aggregate. It is the utilization of hierarchical storage of lossey representations of base file segments derived to hold varying degrees of information up to some maximum level that enables efficient representation of a file.

Once the SCAN program 10 has completed the Segments Description Structure and returned, either the SAVE program 12 or the COMPACT program 18 can be run. The COMPACT program 18 simply reduces the amount of onboard memory the Segments Description Structure consumes by removing the aforementioned redundant data therefrom. The SAVE program 12, on the other hand, writes a compacted version of the Segments Description Structure to non-volatile storage, such as a hard disk, to generate a checkpoint for the provided base file.

With reference now to the table in FIG. 10 of the accompanying drawings, the four types of checkpoint-stored Segment Descriptions (SDs) used by the SAVE program 12 will be described. The figures in the Lossey Image Bytes and Signature Bytes columns are derived from the SCAN program 10 shown in FIG. 4 and the use of 32-bit CRC signatures respectively. Node types L, H and S can be directly mapped onto Segment Descriptions SDs existing in the Segments Description Structure. The last node type, X, makes it possible to describe Segment Description Structures as a sequential list of SD Nodes such that it may be reconstructed using a macro-like expansion, as will be described hereinbelow with reference to FIG. 11.

As the aforementioned sequential list of SD nodes is comprised of node types requiring from zero to six bytes of storage, the individual nodes cannot later be extracted by reading equal consecutive blocks of data. Therefore to make their later decoding possible, an array of their binary type codes is written also. As two bits are needed to specify each type code, the size of the array is equal to the number of sequential segments, plus the number of trees in the Segments description structure, divided by four, rounded up—a relatively small quantity.

Figure 11:
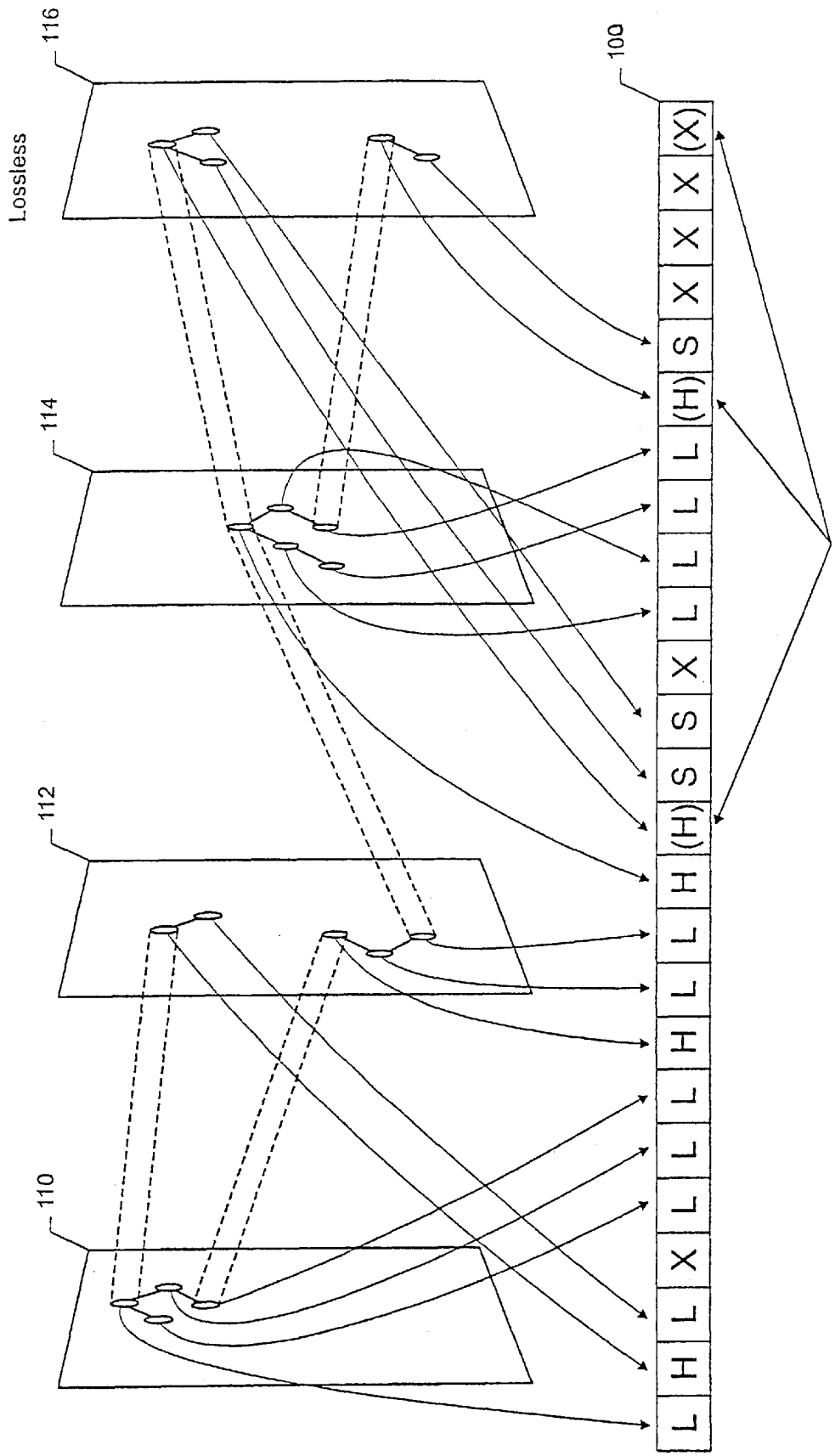
FIG. 11 is a diagram showing how, given some hypothetical segments description structure, the Segment description Nodes shown in FIG. 10 might be ordered on disk to allow reconstruction of the structure.

FIG. 11 of the accompanying drawings illustrates how a sequential list 100 of Segment Description (SD) nodes is created by the SAVE program 12 from the binary trees in plural planes of resolution 110, 112, 114 and 116 produced by the SCAN program 10. It can be seen from FIG. 11 that the existence of H type nodes in signature sorted trees can be inferred from the array context, thus enabling them to be omitted from the array. These H nodes are also exceptional because, as they do not describe an increment between lossey resolutions, they require no storage in the list of SD Nodes. Also, as the order of SD Nodes bears no relation to the sequence index of the corresponding sequential segment an array providing the sequence indexes of L and S type nodes must also be written.

Figure 12:
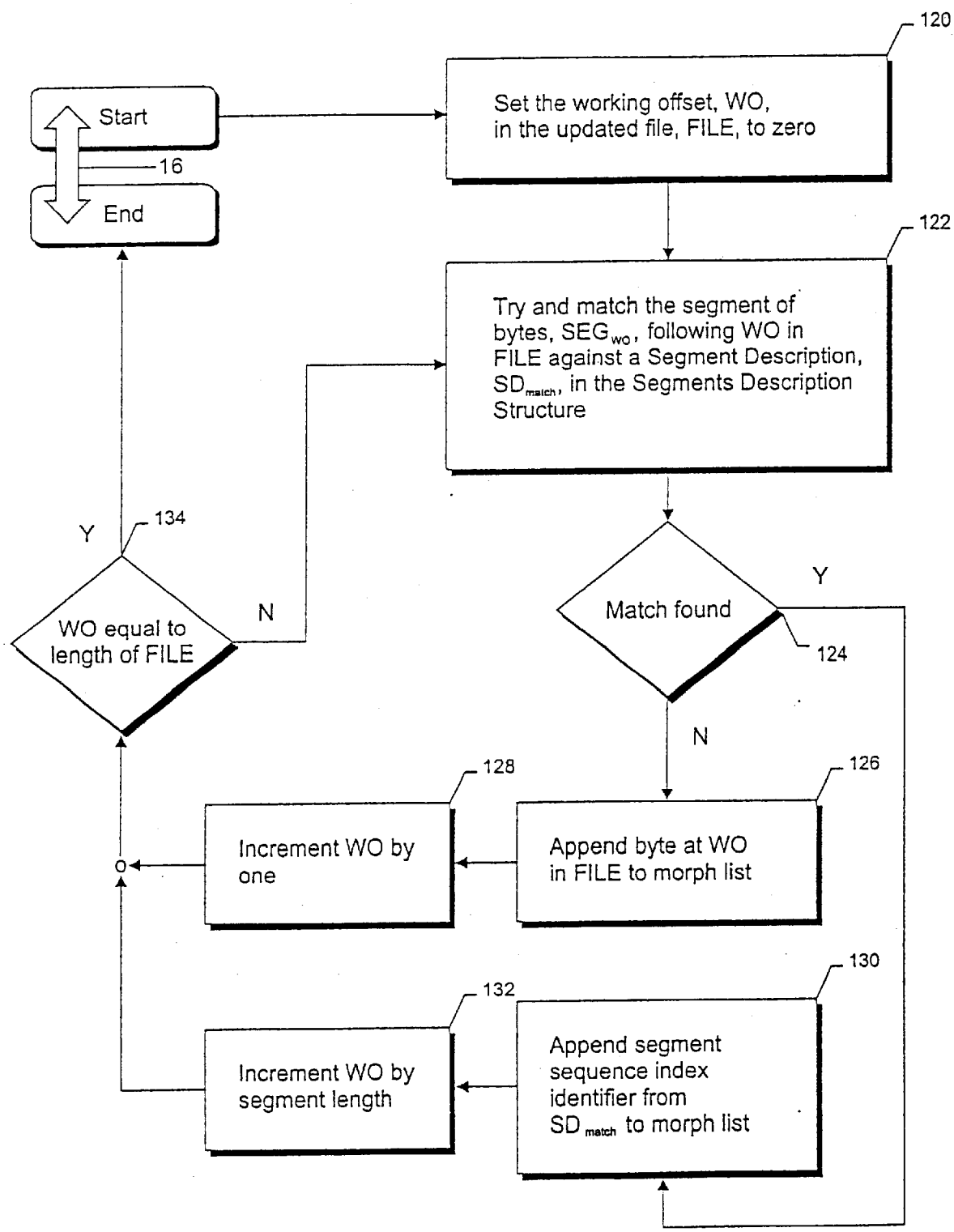
FIG. 12 is a high-level flow chart describing a MATCH program.

The calculation of how to transform the base file into the updated file is performed by the MATCH program 16. The MATCH program 16 requires both the updated file and the corresponding base file's loaded Segments Descriptions Structure as parameters. If the Segments Description Structure is not already in memory then the LOAD program 14 can be called to load it up from the corresponding base file's checkpoint. The MATCH program 16 then generates a Morph List describing the updated file as a list of new bytes and sequential segments from the base file (identified by their index numbers). The operations performed by the MATCH program 16 are illustrated in FIG. 12 of the accompanying drawings. As shown therein, the MATCH program 16 begins at step 120 by setting its working offset in the updated file to zero (the first byte). The MATCH program 16 then involves moving incrementally through the provided updated file. In step 122 the MATCH program 16 at each offset scans the Segments Description Structure for a segment with an image description matching the following segment of bytes in the updated file. If there is no match, then decision 124 determines that a byte unique to the provided file has been found. The method then proceeds to step 126 where the byte at the current working offset is appended to the Morph List. The working offset is then incremented by one at step 128. If, alternatively, a match is determined at decision 124, then a segment has been found in the updated file that exists in the base file. The segment identifier is then appended to the Morph List at step 130 and the working offset is incremented by the standard segment length at step 132. This process continues until at decision 134 it is determined that the working offset extends beyond the end of the file. At this point a description of the updated file has been created in terms of unique bytes and segments from the base file.

Figure 13:
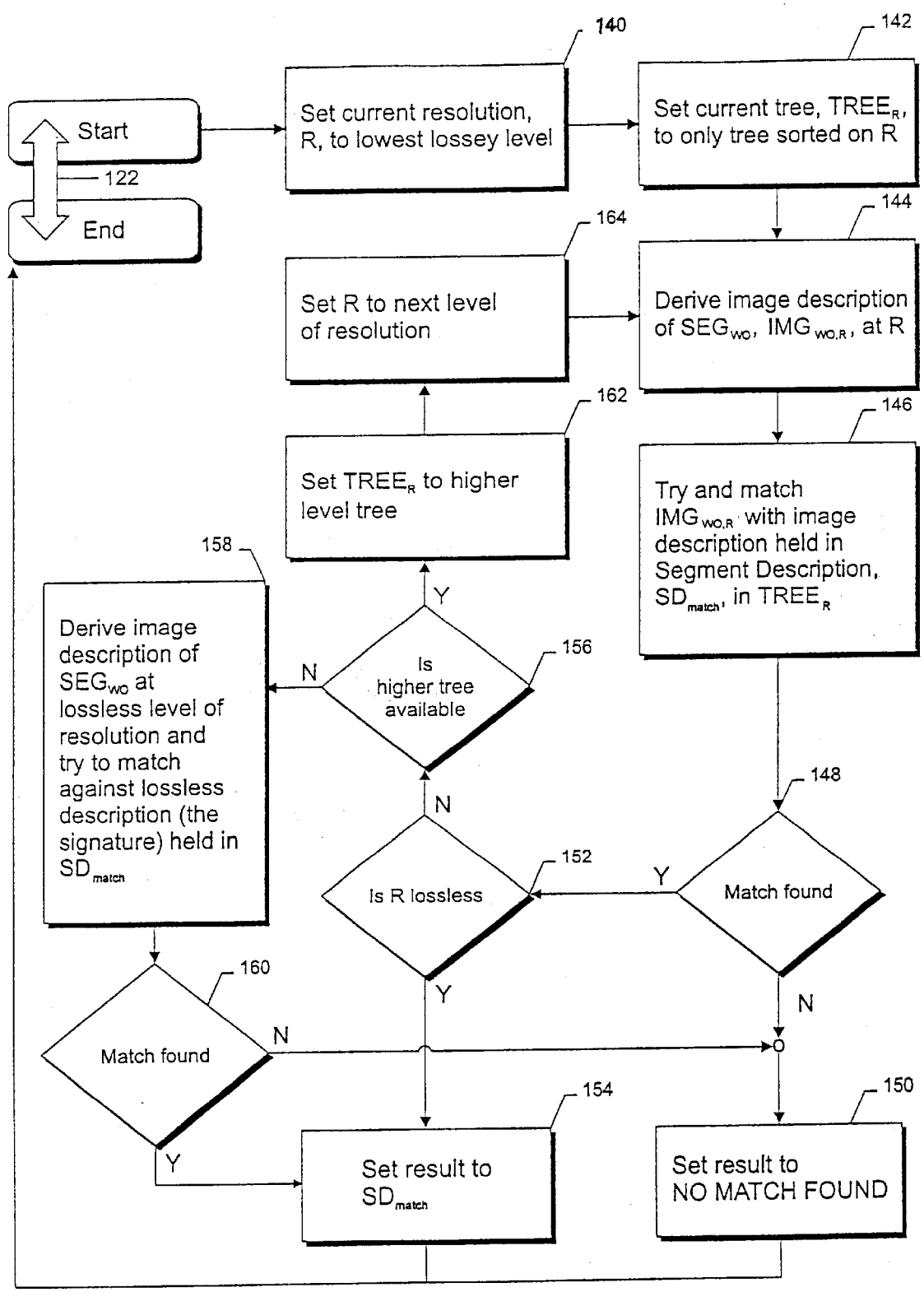
FIG. 13 is a flow chart showing part of the MATCH program in greater detail.

The procedure by which the MATCH program 16 determines in step 122 whether the Segments Description Structure contains a matching description of a segment is illustrated in FIG. 13 of the accompanying drawings. Resolution can range from the lowest lossey resolution up to the lossless (signature based) resolution. The procedure 122 first sets the current resolution to the lowest lossey level at step 140 and then selects the single root tree that is sorted upon it at step 142. Next at step 144 a description of the current segment's image is derived at the current resolution (which can be either lossey or lossless). At step 146 an attempt is made to find a Segment description in the current tree that contains a matching image description.

If a match cannot be found at decision 148, then the Segments Descriptions Structure cannot hold a matching image description. So at step 150 the procedure returns that no match has been found. If, alternatively, there is a match, at decision 152 a check is made as to whether the current resolution (R) is lossless. If the current resolution is lossless, then the segment's signature matches the signature held in the Segment description, and at step 154 SD match is set and a match is returned.

If, on the other hand, it is determined at decision 152 that the current resolution is lossey, then a check is made at decision 156 as to whether the matching Segment Description is also the root of a tree sorted upon a higher resolution. If this is the case, then the higher tree is entered at step 162, the current resolution is set to be one level higher at step 164, and the procedure returns to step 144 to derive a new description of the segment's image at the new resolution.

If it is determined at decision 156 that no higher resolution tree is available, then it is no longer possible to put off calculating a signature for the segment. The signature of the segment's bytes is therefore calculated and compared to the signature held in the Segment Description at step 158. If the signatures are found to be the same at decision 160, the method returns the Segment Description as a match at step 154. If the signatures aren't the same the method returns that no match has been found at step 150.

Those possessed of the appropriate skills will appreciated from the foregoing description of the SCAN program 10 that if Segments Description Structures are constructed using a large sampling resolution, a relatively small penalty is paid in terms of the space consumed. It is also the case that if an image sampled for a segment recurs, then the segment will most likely eventually be described by some higher resolution image. Thus on the one hand the SCAN program 10 greatly increases the overall sampling resolution relative to the size of the checkpoint, and on the other hand it concentrates higher resolution sampling on describing segments whose lower resolution images occur most commonly.

Consequently the performance characteristics of the MATCH program are improved. The increased overall sampling resolution improves its overall performance and the adaptive concentration of resolution reduces the performance degrading effect of recurring patterns within the represented base file. These advantages are delivered by the novel hierarchical representation of data sampled from segments across a range of resolutions as shown in and described with reference to FIGS. 7 and 9 of the accompanying drawings for example.

The above described programs are faster than those hitherto known because on average fewer signature calculations were made when determining whether updated file segments match base file segments described in the checkpoint. This is partly because given some arbitrary checkpoint size, relatively more lossey description bytes can be stored for each base file segment and these can later be used to disqualify updated file segments as possible matches without resorting to signature calculation. The abovedescribed hierarchical storage of segment descriptions enable more lossey bytes to be stored. Therefore it is possible that some other type of search structure replace the binary trees in the data structure hierarchies. In such a case the aforementioned algorithms would not change, but references to trees would be replaced by the new structure.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

What is claimed is:

1. A method of producing a checkpoint which describes a base file, the method comprising:
   dividing the base file into a series of segments;
   generating for each segment a segment description, wherein each segment description comprises a lossless signature and a plurality of lossey samples each describing the segment at a different level of resolution; and
   creating from the generated segment descriptions a segments description structure as the checkpoint,
   wherein the segments description structure is created by selecting for each segment from among the plural lossey samples and lossless signature a description that adequately distinguishes the segment to the lowest level of resolution.

2. A method as claimed in claim 1, wherein all segments are of equal, predetermined length.

3. A method as claimed in claim 1, wherein the plurality of lossey samples comprises a first lossey sample containing data selected from the segment at a first level of resolution and a second lossey sample containing data selected from the segment at a second, lower level of resolution, and the data selected for the second lossey sample is a subset of the data selected for the first lossey sample.

4. A method as claimed in claim 1, wherein each segment description comprises a segment index defining the position of the segment in the series.

5. A method as claimed in claim 1, wherein the description is selected for each segment by comparing the plural lossey samples and the signature with respective plural lossey samples and signatures of other segments earlier in the sequence starting with the lossey samples at the lower level of resolution.

6. A method as claimed in claim 1, wherein the segments description structure comprises binary tree structures created by comparing a characteristic of a segment description of one segment with the characteristic of a segment description of another, previously entered segment, and determining whether the characteristic is greater than, less than, or equal to the characteristic of the other segment.

7. A method as claimed in claim 6, wherein the segment description of the one segment is entered into a binary tree at the same level of resolution as the segment description of the other segment if the characteristic of the one segment is less than or greater than the characteristic of the other segment, and the segment description of the one segment is entered into a binary tree at a higher level of resolution than the segment description of the other segment if the characteristic of the one segment is equal to the characteristic of the other segment.

8. A method as claimed in claim 1, wherein the segments description structure is created by entering the lossless signature of a segment only if none of the plural lossey samples adequately distinguish the segment.

9. A method as claimed in claim 1, wherein, once a segment description has been placed in the segments description structure, redundant data is removed from the segment description in order to reduce the amount of data in the segments description structure.

10. A method as claimed in claim 9 wherein the redundant data comprises lossey samples at a resolution greater than that at which the segment description is entered into a binary tree.

11. A method as claimed in claim 9 wherein the redundant data comprises information derivable from lossey samples entered into binary trees at resolutions lower than that at which the segment description is entered into a binary tree.

12. A method of producing a morph list that defines an updated version of a base file with reference to the base file and a checkpoint for the base file, the method comprising:
   producing the checkpoint by
      dividing the base file into a series of segments,
      generating for each segment a segment description, wherein each segment description comprises a lossless signature and a plurality of lossey samples each describing the segment at a different level of resolution, and
      creating from the generated segment descriptions a segments description structure as the checkpoint,
      wherein the segments description structure is created by selecting for each segment from among the plural lossey samples and lossless signature a description that adequately distinguishes the segment to the lowest level of resolution;
   defining a first segment at a start position in the updated file;
   generating a segment description for the first segment;
   comparing the segment description for the first segment with segment descriptions of the checkpoint; and
      if a match is found, adding the matched segment description to the morph list and, if no match is found adding data in the first segment to the morph list.

13. A method as claimed in claim 12 further comprising defining a second segment, and wherein the second segment is defined at a position adjacent to the first segment if a match is found and the second segment is defined at a position overlapping but not including the data added to the morph list if no match is found.

14. A method as claimed in claim 12 wherein the data in the first segment added to the morph list comprises a first byte in the segment.

15. A method as claimed in claim 12 wherein the segment description for the first segment is compared with segment descriptions of the checkpoint by comparing samples of the first segment with samples in the checkpoint starting with the lossey samples at the lower level of resolution.

16. A method as claimed in claim 15, wherein, when a match is found, samples are compared at increasing levels of resolution to identify matching samples until no further match is found, and then the matching samples are compared with the lossless signature.

17. A method of generating a difference file defining differences between an updated file and a base file, the method comprising:
   generating a checkpoint by
      dividing the base file into a series of segments,
      generating for each segment a segment description, wherein each segment description comprises a lossless signature and a plurality of lossey samples each describing the segment at a different level of resolution, and
      creating from the generated segment descriptions a segments description structure as the checkpoint,
      wherein the segments description structure is created by selecting for each segment from among the plural lossey samples and lossless signature a description that adequately distinguishes the segment to the lowest level of resolution;
   generating at different levels of resolution segment descriptions for segments in the updated file and comparing the generated segment descriptions with segment descriptions in the checkpoint to identify matching and non-matching segments; and
   storing as the difference file data identifying segments in the updated file that match segments in the base file and data representing portions of the updated file at a minimum level of resolution sufficient to represent distinctly the portion.

* * * * *